April 8, 1969     J. S. SPROUL ET AL     3,437,433
HIGH DENSITY SODIUM TRIPOLYPHOSPHATE (FORM I)
Filed June 23, 1966
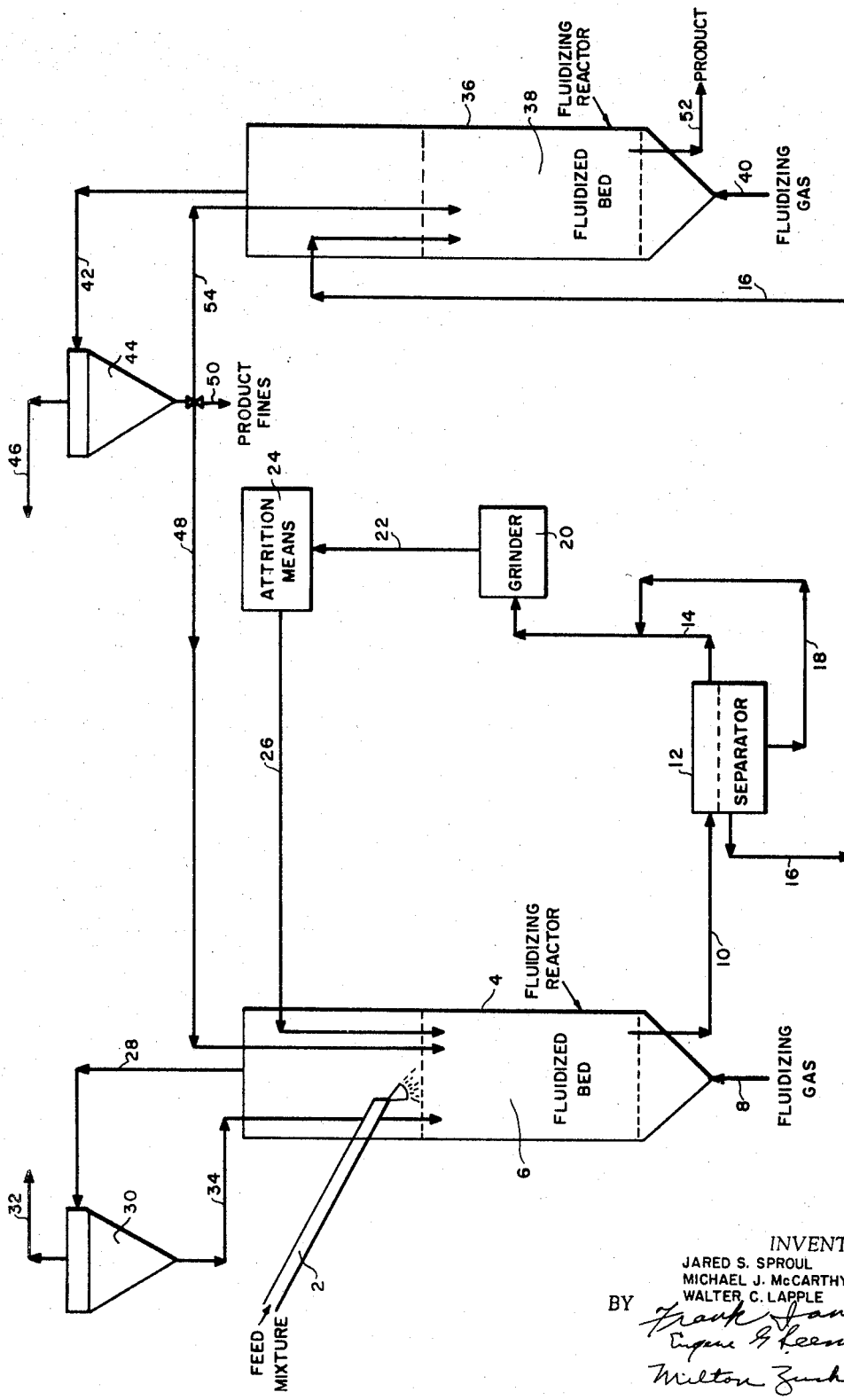
INVENTORS
JARED S. SPROUL
MICHAEL J. McCARTHY
WALTER C. LAPPLE United States Patent Office 3,437,433
Patented Apr. 8, 1969

3,437,433
HIGH DENSITY SODIUM TRIPOLYPHOSPHATE
(FORM I)
Jared S. Sproul and Michael J. McCarthy, Fanwood, N.J., and Walter C. Lapple, Alliance, Ohio, assignors to FMC Corporation, New York, N.Y., a corporation of Delaware
Filed June 23, 1966, Ser. No. 559,993
Int. Cl. C01b 25/30
U.S. Cl. 23—106
11 Claims

ABSTRACT OF THE DISCLOSURE

Dense granular Form I sodium tripolyphosphate (STPP) having a size of from about −20 mesh to about +100 mesh and a bulk density of 0.95 to 1.3 g./cc. is produced by feeding an aqueous mixture of sodium orthophosphate wherein the Na/P molar ratio is 1.63–1.7 into a first fluidized bed containing discrete particles of sodium tripolyphosphate, maintaining the particles at 220–400° C., removing a portion of the fluidized particles from the first fluidized bed, crushing a portion of the removed particles to obtain a mixture having a smaller average size than the particles within the bed, recycling this mixture of crushed particles back to the first fluidized bed to replace the number of particles removed from the bed, recovering the remaining uncrushed fraction as Form II STPP, feeding the Form II STPP to a second fluidized bed at a temperature of 425–550° C., converting the Form II STPP to Form I STPP and recovering the dense granular Form I STPP as product.

---

The present invention is concerned with the formation of a high density, granular sodium tripolyphosphate, and more specifically, to granular (−20 +100 mesh) Form I sodium tripolyphosphate having a bulk density of from about 0.95 to about 1.3 g./cc.

In the formation of modern heavy-duty detergent compositions sodium tripolyphosphate (STPP) has come into widespread use as a phosphate "builder" in order to increase the cleaning ability of these detergent compositions. The classic method for producing STPP is to react phosphoric acid and an alkaline compound such as sodium hydroxide or sodium carbonate together in an aqueous solution such that the molar ratio of sodium to phosphorous is on the order of about 1.67. This reaction results in the formation of an aqueous mixture containing monosodium orthophosphate and disodium orthophosphate in a mole ratio of about 1:2. The free water is removed from the phosphate mixture by passing it through a heating zone where it is progressively heated to higher temperatures. At a temperature of about 250° C. or higher STPP is formed. While the exact mole ratio of sodium to phosphorous which is employed may be varied the ultimate reaction takes place in accordance with the following equation:

The resulting STPP ($Na_5P_3O_{10}$) is a crystalline anhydrous product capable of having two physical forms. Form I is produced in rotary kilns at temperatures of from about 500° to about 600° C., while Form II is produced at temperatures below about 500° C.

In our copending application Ser. No. 559,994, filed June 23, 1966, in the names of Jared S. Sproul and Walter C. Lapple, there is described a process for producing a high bulk density (0.95–1.3 g./cc.) granular STPP of the Form II configuration. The bulk density is the weight of STPP which freely flows into a container of given volume. A convenient method for measuring bulk density is the Solvay Process Method 302A set forth in the Solvay Technical and Engineering Service Bulletin No. 9 (page 33), issued in 1944.

In brief the process of this copending application is carried out by spraying an aqueous solution of sodium orthophosphate having an Na/P molar ratio of about 1.63–1.7 into a fluidized bed containing discrete particles of STPP. The fluidized bed is maintained at a temperature of from about 220° to about 400° C. and fluidized by passing a heated gas which is not reactive with the STPP particles upwardly through the bed to suspend the particles. A portion of the fluidized particles from the bed is constantly removed, crushed until it has a smaller average size than the particles within the bed and then recycled back to the bed. A product fraction of STPP particles is withdrawn from the bed having a size of from about −20 to +100 mesh. The product fraction most conveniently is selected from a −20 +100 fraction of fluidized particles withdrawn from the bed, and is not crushed or recycled to the bed.

Increased densification of the product is provided by introducing certain additives into the fluidized bed with the aqueous solution, namely, about 1.5% based on the weight of the STPP product removed, of either ammonium nitrate or an alkali metal nitrate. Additional densification of the product is also obtained by subjecting the particles in the recycle stream, after being crushed to a smaller average size than the particles within the bed, to high speed mechanical attrition with a striking element traveling at a peripheral velocity of at least 2300 ft./min. prior to recycling the particles back to the bed.

In the above process Form II STPP is obtained by carrying out the conversion of the sodium phosphate to STPP at temperatures of from about 220–400° C. It is possible to produce Form I STPP by the above process by utilizing temperatures no lower than about 425° C. in the fluidized bed; however, the Form I STPP produced thereby has a lower STPP assay than would be obtained if Form II STPP were produced. This is most undesirable. In addition, the capacity of the unit to produce Form I vis-a-vis Form II STPP decreases substantially because of the higher heat load placed on the unit and the lower heat efficiency that results from using higher exit gas temperatures.

Attempts to increase the temperature of the fluidizing gas to cope with the increased heat load results in the fusion of some STPP particles on the grid plate of the fluid reactor. The grid plate is located at the base of the fluidized reactor and helps to distribute fluidizing gas through the fluidized bed. The resultant fused particles interfere with proper operation of the unit and frequent shutdowns are required for cleaning and repairing.

It is an object of the present invention to produce high density STPP granular product of the Form I configuration in a readily workable process in which the assay of the STPP recovered is maintained at a high level.

It is a further object of the present invention to produce granular, Form I STPP whose density can be controlled within a range of 0.95 to 1.3 g./cc.

These and other objects will be apparent from the following description.

We have now found that a dense, granular Form I STPP product having a size of from about −20 mesh to about +100 mesh and a bulk density which can be controlled between 0.95 and 1.3 g./cc. can be produced by:

(a) Feeding an aqueous mixture having a concentration of 35–60% by weight of sodium orthophosphate, wherein the Na/P molar ratio is about 1.63–1.7, into a first fluidized bed containing discrete particles of STPP;

(b) Maintaining the particles in the first fluidized bed at a temperature of from about 220° to about 400° C.;

(c) Removing fluidized particles of Form II STPP from the first fluidized bed and separating the removed particles into a coarse fraction (nominally +20 mesh) and a fine fraction (nominally −20 mesh);

(d) Crushing the coarse fraction and mixing the crushed particles with a portion of the fine fraction to obtain a mixture having a smaller average size than the particles within the first fluidized bed (preferably not smaller than about 70 mesh);

(e) Recycling this mixture of particles back to the first fluidized bed in amounts sufficient to replace the number of particles removed therefrom;

(f) Introducing the remaining portion of the fine fraction not mixed in step (d) into a second fluidized bed maintained at temperatures of about 425–550° C. (and preferably containing a partial pressure of water of at least about 10 mm. of Hg) for a time sufficient to obtain conversion of Form II STPP to Form I STPP in the particles; and (g) Withdrawing as product from the second fluidized bed STPP particles containing a higher Form I STPP content than the particles introduced into the second fluidized bed and having a density of from about 0.95 to about 1.3 g./cc.

Most advantageously, all of the product is recovered as granular (+20 −100 mesh) STPP product containing the Form I configuration and having an assay of from 96–99% STPP. Surprisingly, the STPP assay does not decrease during the conversion of the Form II STPP to the Form I configuration.

In carrying out the present process an initial bed containing STPP particles is fluidized by passing an upflowing stream of gas through the particles. The upflowing gas stream is maintained at a sufficient velocity to suspend the particles in a turbulent bed resting only on the rapidly moving gas. The particles in the bed desirably have a size of about −10 to about +100 mesh. The fluidizing gas may be any gas which is not reactive with the particles in the bed, e.g., air, nitrogen, $CO_2$, combustion gases from burning natural gas, etc.

The velocity of the upflowing gas stream needed to fluidize the particles will vary depending upon the particle size, size distribution and height of the bed. In general, fluidizing velocities of from about 2.5 ft./sec. to about 5 ft./sec. have been found satisfactory; fluidizing velocity is defined as the volume flow of gas in the bed divided by the cross-sectional area of the bed. The volume flow of gas does not include water vapor derived from the contents of the bed. The initial fluidized bed is maintained at a temperature of from about 220° to about 400° C. with temperatures on the order of about 230–275° C. being preferred.

To the thus heated particles in the initial fluidized bed is added an aqueous feed liquor containing sodium and phosphorous values in an Na/P molar ratio of about 1.63–1.7. Molar ratios of Na/P of about 1.65 to about 1.69 have been found particularly advantageous. The aqueous feed liquor can have a concentration of about 32–55% of STPP equivalent; this corresponds to a sodium orthophosphate concentration of about 35–60% wherein the Na/P molar ratio is about 1.63–1.7. As the feed liquor concentration is reduced the density of the STPP product obtained from the initial fluidized bed increases, e.g., up to about 1.25 g./cc. While the aqueous feed liquor can be fed in at room temperature it is preferred to heat the liquor to a temperature of from about 80–100° C. to permit making up concentrated solutions and to minimize the heat load on the initial fluidized bed.

As the aqueous feed enters the initial fluidized bed it coats the surface of the fluidized STPP particles and the water in the feed is rapidly evaporated. The residual sodium phosphate deposits a shell on the outer surface of the particles and is quickly converted to STPP at the operating temperatures of the initial fluidized bed. In this way the particles in the bed increase in size by the laminar build up of STPP layers.

A portion of the particles in the bed continuously removed and screened to separate oversized particles (preferably +20 mesh) from the remaining fine (−20 mesh) particles. The oversized (+20 mesh) fraction is lightly crushed in a mill such as a Fitzpatrick comminuting machine (Fitz mill) or a roller mill so that the particles have a smaller average size than the particles in the initial fluidized bed. The crushing step should be controlled to avoid obtaining a substantial amount of −70 mesh particles. In general, these crushed particles should have a size of about −20 to about +70 mesh; they are then recycled to the initial fluidized bed.

The fine (−20 mesh) fraction which is removed from the fluidized bed may be screened to separate an initial product fraction, normally −20 to +100 mesh and preferably −20 to +70 mesh. All −20 to +100 mesh particles not withdrawn as product are recycled with the crushed particles from the Fitz mill to the initial fluidized bed. In the preferred manner of operation for obtaining highest bulk density all −20 mesh particles not withdrawn as product are mixed with the over-sized (+20 mesh) particles and sent to a mill to crush the mixture so that the resulting crushed mixture has a smaller average size than the particles within the initial fluidized bed; the crushed mixture is then recycled to the initial fluidized bed.

The ratio of recycled particles to initial STPP product removed from the bed may vary from about 0.5:1 to about 5:1. It is preferred to conduct the recycle at ratios of from about 1:1 to about 2:1. In general, the recycle must replace the number of particles drawn off from the bed in order to have a continuous self-replenishing fluidized bed.

In addition to removing an initial product from the bed, smaller particles (fines) are inevitably blown out through the top of the initial fluidized bed and may be separated from the gas stream and recycled to the bed to prevent loss of phosphorous values in the system.

The initial product which is recovered from the first fluidized bed has a bulk density of at least 0.95 g./cc. up to about 1.3 g./cc. and is composed principally of the Form II configuration of STPP. The initial (Form II STPP) product is then passed into a second fluidized bed which is maintained at a temperature of from about 425–550° C. and preferably from 430–500° C. The second fluidized bed is maintained by passing an upflowing gas stream through the bed in the same manner as the first fluidized bed. In general, the mode of operation is the same with respect to the type of gases which may be used as fluidizing mediums and with respect to the fluidizing velocities which must be used to maintain the bed in a fluidized state.

At the temperature maintained in the second fluidized bed Form II STPP is converted to the Form I configuration. The Form I containing product desirably has a density of from about 0.95–1.3 g./cc., an STPP assay of greater than 95% and a size of from about −20 to +100 mesh. If desired, the second fluidized bed can be operated in such a manner that only a portion of the product is completely converted to the Form I configuration. In such case the product will be a mixture of Form II and Form I in which the amount of Form I can be regulated by the time of treatment and/or the temperature used in the conversion of Form II to Form I.

The conversion of Form II to Form I STPP in the second fluidized bed is facilitated by introducing a partial pressure of at least about 10 mm. of Hg of water vapor into the fluidizing gas. The presence of this water vapor in the fluidized bed appears to permit the conversion of Form II to Form I at somewhat lower temperatures. Preferred moisture contents of the fluidizing gas and the fluidized bed are from about 15 to about 60 mm. of Hg of water vapor.

Another technique for increasing the conversion of Form II to Form I in the second fluidized bed is to incorporate a small amount on the order of about 0.001–0.01 lb. of certain potassium compounds per pound of sodium orthophosphate in the feed liquor. These potassium compounds include potassium phosphate, potassium sulfate, potassium hydroxide, potassium carbonate, potassium chloride and potassium nitrate. The preferred compound for facilitating conversion to Form I is potassium phosphate. The mechanism by which the added potassium compound affects the conversion of Form II to Form I is unknown.

In order to obtain maximum density of the intermediate Form II STPP product from the initial fluidized bed two densifying techniques are desirable. In the first technique either ammonium nitrate or an alkali metal nitrate such as sodium nitrate, potassium nitrate, etc., is added to the initial fluidized bed in amounts up to about 1.5% based on the weight of initial (Form II STPP) product removed. A second technique for increasing the density of the initial product which can be used either in conjunction with the nitrate addition or separately is subjecting the recycle STPP particles to high speed mechanical attrition. This is achieved by placing the STPP particles prior to recycle in a container and subjecting them to a striking force by a striking element (preferably a rotating blade) traveling at a peripheral velocity of at least about 2300 ft./min. and preferably 2300–10,000 ft./min. The attrition serves to round off corners or other irregularities in the treated particles prior to recycling them to the initial fluidized bed. It is preferred to utilize the mechanical attrition step in the recycle stream following the mild crushing of the recycle particles.

A preferred practice of the present process will now be illustrated with reference to the attached drawing which represents a diagrammatical flow sheet for carrying out the invention in a continuous process.

In the drawing an aqueous feed liquor is introduced through line 2 into the fluidizing reactor 4 containing a fluidized bed 6 supported by a fluidizing gas introduced through bottom port 8. The aqueous feed liquor introduced into line 2 contains a mixture of monosodium orthophosphate and disodium orthophosphate having an Na/P molar ratio of about 1.63–1.7. In addition the feed liquor may also contain an agent for densifying the STPP product such as ammonium nitrate or an alkali metal nitrate such as sodium nitrate or potassium nitrate. For ease of operation sodium nitrate is preferred because it does not introduce contaminating cations into the product. The fluidized bed 6 contained in the fluidizing reactor 4 contains granular STPP particles ranging in size from about −10 to +100 mesh. In continuous operation this bed contains substantially all STPP except for minor amounts of orthophosphate and intermediate polyphosphates being converted to STPP.

In starting up the bed the preferred method is to utilize preformed particles of STPP. This permits the immediate formation of a uniform bed which has no sticking or agglomerating tendencies. An alternate method of starting is to treat a mixture of monosodium orthophosphate and disodium orthophosphate in the correct ratio to yield STPP and heat this in a preliminary heating zone until a substantial portion has been converted to sodium pyrophosphate. This blend can then be placed in a fluidized bed and converted to STPP within the bed. It is not advisable to attempt to form a fluidized bed of STPP commencing with sodium orthophosphate since this goes through a sticky state as it passes from the orthophosphate to the pyrophosphate stage and prevents proper fluidization of the mixture. The fluidized bed 6 is maintained at a temperature of about 220° to about 400° C. during the reaction. This temperature can be achieved by preheating the fluidizing gas or by externally heating the fluidized bed by means of a heating jacket, not shown, surrounding the fluidizing reactor 4. The preferred method is to heat the fluidizing gas to temperatures on the order of about 600° C. The feed liquor is maintained as concentrated as possible commensurate with obtaining the density desired of the final product. In general, more dilute solutions yield the higher densities.

In the fluidized bed 6 the fluidized particles commence to grow as follows. The feed liquor deposits an aqueous mixture of sodium phosphates on the surface of the particles. Water in the feed is immediately evaporated leaving a sodium orthophosphate residue which is converted to STPP at the temperatures existing in the fluidized bed. The deposition of laminar layers of STPP on the surface of the particles results in the formation of a very dense particle. A portion of the fluidized particles is then removed from the fluidized bed 4 by means of conduit 10 and passes into a separator 12. The separator 12 may be a screening device, an elutriator or air classifier commonly used in the art. The separator 12 divides the particles into two fractions.

The first fraction is made up of particles which are larger than the average diameter of the desired product which for convenience sake is normally considered about +20 mesh. These are withdrawn from the separator 12 through conduit 14 and passed to a grinder 20 and lightly crushed so that the particles have a size of −20 +70 mesh. From the second (−20 mesh) fraction, a portion is withdrawn through conduit 16 as an initial (Form II STPP) product fraction, normally −20 +100 mesh. The remainder of the −20 mesh fraction is removed from separator 12 via line 18. In the preferred mode of operation illustrated in the drawing for obtaining highest density, the fine fraction in line 18 is mixed with the coarse fraction from conduit 14. The mixed fraction is then passed into grinder 20 and ground until its average particle size is somewhat smaller than the average particle size of the particles in the fluidized bed 6, but no finer than about 70 mesh.

The function of the grinding stage is to reduce the size of the particles which are recycled into the bed so laminar build up of STPP layers is obtained on these particles. This results in the production of an extremely dense product.

The crushed mixture which is obtained in conduit 22 is then preferably passed through attrition means 24. In this stage the particles are subject to high speed mechanical attrition by being struck by one or more blades traveling at a velocity of from about 2300–10,000 ft./min. The mechanical attrition obtained rounds off the corners and other irregularities in the crushed particles. In this way the particles leaving attrition means 24 have a more spherical configuration than those which are removed from grinder 20. The product from attrition means 24 is then recycled through conduit 26 back into the fluidizing reactor 4 and into the fluidized bed 6. The amount of STPP equivalent in the feed liquor and the amount of STPP product removed through line 16 is maintained approximately the same in order to maintain the bed at a constant size. In addition the amount of recycling is regulated so that the number of particles entering fluidized bed 6 is sufficient to replace the number removed through conduit 10.

In the above description the −20 mesh fraction not withdrawn as an initial product from separator 12 is mixed with the coarse (+20 mesh) fraction from separator 12 and passed through grinder 20 before it is recycled back to the fluidized bed 6. It is also possible if desired to recycle the −20 mesh fraction in line 18 directly to the fluidized bed 6 without sending it through the grinder 20.

In the above description of the first stage of the invention the initial (Form II STPP) product was removed as an undersized fraction (nominally −20 mesh) directly from the initial fluidized bed. However, it is within the contemplation of the invention that some (−20 mesh) initial product may also be screened out of the system after the grinding step 20 or the mechanical attrition step 24; this is a more difficult and expensive separation than removing the initial product from unground particles of the initial fluidized bed and thus is not economically attractive.

In the operation of the fluidized bed some fines will be blown out of the fluidized bed 6 with the overhead gases. These particles can be recovered from the overhead port 28 by means of a cyclone separator 30 or other separating means. The recovered fines may then be returned by line 34 while the overhead gas stream is passed through separator 30 and vented through conduit 32. These fines agglomerate within the bed into larger size particles which remain fluidized thereby preventing STPP losses in the fluidized reactor.

The initial (Form II STPP) product removed from separator 12 through line 16 is passed into a second fluidized reactor 36 and into the second fluidized bed 38. The fluidized bed 38 is maintained at a temperature of at least 425° C. (preferably 430–500° C.) and preferably contains from 15–60 mm. of Hg of water vapor. This temperature can be achieved by preheating the fluidized gas or by externally heating the fluidized bed by means of a heating jacket, not shown, surrounding the fluidizing reactor 36. The preferred method is to heat the fluidizing gas to temperatures on the order of about 600° C. The water vapor can be supplied by the combustion of natural gas in the fluidizing gas stream or by injecting water therein.

After remaining in the fluidized bed for the required amount of time the product is removed from the bed 38 through line 52, cooled and recovered. Small particles (fines) are removed with the fluidizing gas through overhead line 42 and are separated from the fluidizing gas in a cyclone separator 44. The fines may be returned to fluidized bed 6 through line 48 or to fluidized bed 38 through line 54 while the fluidized gas is vented through line 46. If desired, a portion of the fines may be recovered as dense product through line 50 from separator 44.

The following examples are given to illustrate the present invention and are not deemed to be limiting thereof.

EXAMPLE 1

*Run A—Process of the invention.*—A first fluidized bed of sodium tripolyphosphate was established in a fluidized reactor 1.5 ft. in diameter by suspending STPP particles in an upflowing stream of combustion gas flowing at a fluidization velocity of 4.2 ft./sec. The bed was 2.9 ft. high and was maintained at 279° C. by the preheated fluidizing gas. An aqueous solution containing 47% by weight of sodium orthophosphate having a molar ratio of Na/P of 1.67, 0.002 lb. of sodium nitrate per pound of sodium orthophosphate, and 0.0025 lb. of tetrapotassium pyrophosphate per pound of sodium orthophosphate was sprayed into the fluid bed. The solution was introduced at 105 lbs./hr. through a spray nozzle positioned 2 ft. above the bed. Fluidized particles of STPP were discharged from the bed at a rate of 143 lbs./hr. and analyzed 17% +20 mesh, 95% +50 mesh and 99% +100 mesh. The discharged particles were screened to separate +20 mesh particles from the −20 mesh particles. The +20 mesh particles were lightly crushed in a Fitz mill to 0% +20 mesh, 86% +50 mesh and 94% +100 mesh. The crushed particles were mixed with enough −20 mesh particles to provide 95 lbs./hr. of recycle. The recycle stream analyzed 0% +20 mesh, 87% +50 mesh and 96% +100 mesh. The remaining −20 mesh fraction (substantially all −20 +100 mesh) was removed as Form II product at a rate of 48 lbs./hr. and passed into a second fluidized bed. The second fluidized bed was the same size as the first fluidized bed and was maintained in a fluidized condition by combustion gases flowing at a fluidization velocity of 3.5 ft./sec. and containing about 40 mm. of Hg of water vapor. The temperature of the bed was maintained at 470° C. After heating the Form II initial product from the initial bed in the second fluidized bed for an average residence time of three hours, the resultant product analyzed 49% Form I and its assay remained 97.4% STPP. It had a bulk density of 1.0 g./cc.

*Run B—Process employing only one fluidized bed.*—The process of Example 1, Run A, was repeated in substantially the same manner except that only the first fluidized bed was used and this was heated to a temperature of 440° C. The resultant product from this bed contained 38% Form I STPP and an assay of 94.2% STPP. It had a bulk density of 1.03 g./cc.

EXAMPLE 2

The process of Example 1, Run A, was repeated except that the second fluidized bed was maintained at a temperature of 475° C. and the Form II particles were heated in the second fluidized bed for six hours. The resultant product from the second fluidized bed analyzed 84% Form I and 97.9% STPP. It had a bulk density of 1.12 g./cc.

EXAMPLE 3

The procedure of Example 1, Run A, was repeated substantially as set forth above except that $NH_4NO_3$ was substituted for sodium nitrate. The results were substantially the same as when sodium nitrate was employed.

EXAMPLE 4

The process of Example 1, Run A, was repeated except that the second fluidized bed was maintained at 458° C. and at a partial pressure of water of only 4 mm. of Hg. The Form II initial product was heated in the second fluidized bed for an average residence time of five hours. The resulting STPP product analyzed 18% Form I and had a bulk density of 1.03 g./cc.

EXAMPLE 5

A first fluidized bed of STPP was established in a fluidized reactor 1.5 ft. in diameter by suspending STPP particles in an upflowing stream of combustion gases flowing at a fluidization velocity of 4 ft./sec. The bed was 3 ft. high and was maintained at 279° C. by the preheated fluidized gas. An aqueous solution containing 47% by wt. of sodium orthophosphate having a molar ratio of Na/P of 1.67 and 0.009 lb. of sodium nitrate per pound of sodium orthophosphate was sprayed into the initial fluidized bed. The solution was introduced at 105 lbs./hr. through a spray nozzle positioned 2 ft. above the bed. Fluidized particles of STPP were discharged from the bed at a rate of 143 lbs./hr. and analyzed 17% +20 mesh, 95% +50 mesh and 99% +100 mesh. The discharged particles were screened to separate +20 mesh particles from the −20 mesh particles. The +20 mesh particles were mixed with enough of the −20 mesh particles to provide a 95 lbs./hr. recycle. This mixture was lightly crushed in a Fitz mill and then passed through a high shear attrition means which had blades turning at a peripheral velocity of about 2300 ft./min. The discharge from the high shear attrition means was returned to the initial fluidized bed as a recycle stream. The recycle stream analyzed 0% +20 mesh, 89% +50 mesh and 95% +100 mesh. The remaining −20 mesh fraction was removed as Form II product at a rate of 48 lbs./hr. and passed into a second fluidized bed. The second fluidized bed was of the same size as the first fluidized bed and was maintained in a fluidized condition by combustion gases flowing at a fluidization velocity of 3.5 ft./sec. and containing about 26 mm. of Hg of water vapor. The temperture of the second fluidized bed was maintained at 458° C. After heating the Form II initial product in the second fluidized bed for an average residence time of 2 hrs., the resultant product analyzed 42% Form I and its assay was 98.5% STPP. It had a bulk density of 1.28 g./cc.

As will be observed in comparing Run A and Run B of Example 1, Run A was carried out using two fluidized reactors and the product discharged maintained its STPP assay of 97.4% STPP after conversion of a substantial portion of the STPP from Form II to Form I. By contrast in Run B in which only one fluidized bed was employed the STPP discharged had an assay of only 94.2% STPP even though substantially the same conditions were employed in both cases except for the number of fluidized beds employed.

A comparison of Example 4 with Example 1, Run A, further indicates the desirability of having a partial pressure of water of at least 10 mm. of Hg in the fluidized bed during conversion of Form II to Form I. In Example 1, Run A, the bed contained a partial pressure of about 40 mm. of Hg of water; a 49% converion of the STPP product from Form II to Form I was obtained at a temperature of 470° C. and at an average residence time of three hours. By contrast in Example 4 where conversion took place under substantially the same conditions except that the bed contained a partial pressure of water of only 4 mm. of Hg conversion from Form II to Form I STPP only took place to the extent of 18%. This low conversion was obtained despite the fact that the residence time in Example 4 was five hours compared with a three-hour residence time in Example 1, Run A.

Persuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a granular Form I sodium tripolyphosphate product having a size of substantially −20 mesh to +100 mesh by feeding an aqueous mixture of sodium phosphate having an Na/P molar ratio of 1.63 to 1.7 into fluidized reactors containing discrete particles of fluidized sodium tripolyphosphate and heating the particles to temperatures of up to about 550° C. the improvement which comprises controlling the bulk density of the product between 0.95 and 1.3 g./cc. by maintaining particles of sodium tripolyphosphate suspended in a first fluidized bed at a temperature of from 220–400° C., feeding said aqueous mixture of sodium phosphate into said first fluidized bed, removing fluidized particles of Form II sodium tripolyphosphate from said first fluidized bed, separating the removed particles into a coarse fraction and a fine fraction, crushing the coarse fraction and mixing the resultant crushed particles with a portion of the fine fraction to obtain a mixture having a smaller average size than the particles within said first fluidized bed, recycling the mixture of particles back to said first fluidized bed in amounts sufficient to replace the number of particles removed therefrom, introducing the remaining unmixed portion of said fine fraction into a second fluidized bed, heating said particles in said second fluidized bed at a temperature of from 425–550° C. and removing as product high assay sodium tripolyphosphate particles from said second fluidized bed having a higher Form I content than the particles introduced in said second fluidized bed, a bulk density controllable between 0.95 and 1.3 g./cc., and a size of substantially −20 to +100 mesh.

2. In the process of producing a granular Form I sodium tripolyphosphate product having a size of substantially −20 mesh to +100 mesh by feeding an aqueous mixture of sodium phosphate having an Na/P molar ratio of 1.63 to 1.7 into fluidized reactors containing discrete particles of fluidized sodium tripolyphosphate and heating the particles to temperatures of up to about 550° C., the improvement which comprises controlling the bulk density of the product between 0.95 and 1.3 g./cc. by maintaining particles of sodium tripolyphosphate suspended in a first fluidized bed at a temperature of from 220–400° C., feeding said aqueous mixture of sodium phosphate into said first fluidized bed, removing fluidized particles of Form II sodium tripolyphosphate from said first fluidized bed, separating a Form II sodium tripolyphosphate product fraction from the particles removed from said first fluidized bed, crushing sufficient amounts of the remaining fraction to obtain a mixture of particles having a smaller average size than the particles within said first fluidized bed, recycling said mixture of particles back to said first fluidzied bed in amounts sufficient to replace the number of particles removed therefrom, introducing said Form II sodium tripolyphosphate product fraction into a second fluidized bed, heating said particles in said second fluidized bed at a temperature of from 425–550° C. and removing from said second fluidized bed as product high assay sodium tripolyphosphate particles having a bulk density controllable between 0.95 and 1.3 g./cc., a size of substantially −20 to +100 mesh and a higher Form I content than the particles introduced in said second fluidized bed.

3. Process of claim 1 in which the ratio of recycled particles to said unmixed portion of said fine fraction that is introduced into said second fluidized bed, is from 0.5:1 to about 5:1.

4. Process of claim 1 wherein the fluidizing gas of said second fluidized bed contains a partial pressure of at least 10 mm. of Hg of water vapor.

5. Process of claim 1 wherein the fluidizing gas of said second fluidized bed contains a partial pressure of 15–60 mm. of Hg of water vapor.

6. Process of claim 1 wherein said aqueous mixture of sodium orthophosphate contains 0.001 to 0.01 pound of a potassium compound selected from the group consisting of potassium phosphate, potassium sulfate, potassium hydroxide, potassium carbonate, potassium chloride and potassium nitrate per pound of sodium orthophosphate.

7. Process of claim 1 wherein the product has an assay of from 96–99% sodium tripolyphosphate.

8. Process of claim 1 wherein there is added with the aqueous mixture up to about 1.5% based on the weight of the sodium tripolyphosphate product removed, of a member selected from the group consisting of ammonium nitrate and an alkali metal nitrate.

9. Process of claim 1 wherein said fluidized particles removed from said first fluidized bed are separated into a +20 and a −20 mesh fraction, said +20 mesh fraction is lightly crushed, the crushed particles are mixed with a portion of said −20 mesh particles to obtain a recycle mixture whose particles have a smaller average size than the particles within the bed, and said recycle mixture is recycled to said initial fluidized bed.

10. Process of claim 1 wherein said fluidized particles removed from said first fluidized bed are separated into a +20 and a −20 mesh fraction, a portion of said −20 mesh fraction is introduced into said second fluidized bed, said +20 mesh fraction and remaining −20 mesh particles are mixed and crushed to obtain a recycle mixture whose particles have a smaller average size than the particles within said first fluidized bed and said recycle mixture is recycled to said first fluidized bed.

11. Process of claim 1 wherein prior to recycling said mixture of particles back to said first fluidized bed they are subjected to high speed mechanical attrition with a striking element traveling at a peripheral velocity of at least about 2300 ft./min.

References Cited

UNITED STATES PATENTS

| | | | |
|---|---|---|---|
| 3,233,968 | 2/1966 | Koebner et al. | 23—106 |
| 3,360,342 | 12/1967 | Pals | 23—293 |
| 3,210,154 | 10/1965 | Klein et al. | 23—106 |
| 3,094,382 | 6/1963 | Bigot | 23—107 |

OSCAR R. VERTIZ, *Primary Examiner.*

LUTHER A. MARSH, *Assistant Examiner.*